April 3, 1951
M. F. CAMP
2,547,373
SELF-CONTAINED RISING SHADE
Filed Feb. 14, 1949
2 Sheets-Sheet 2
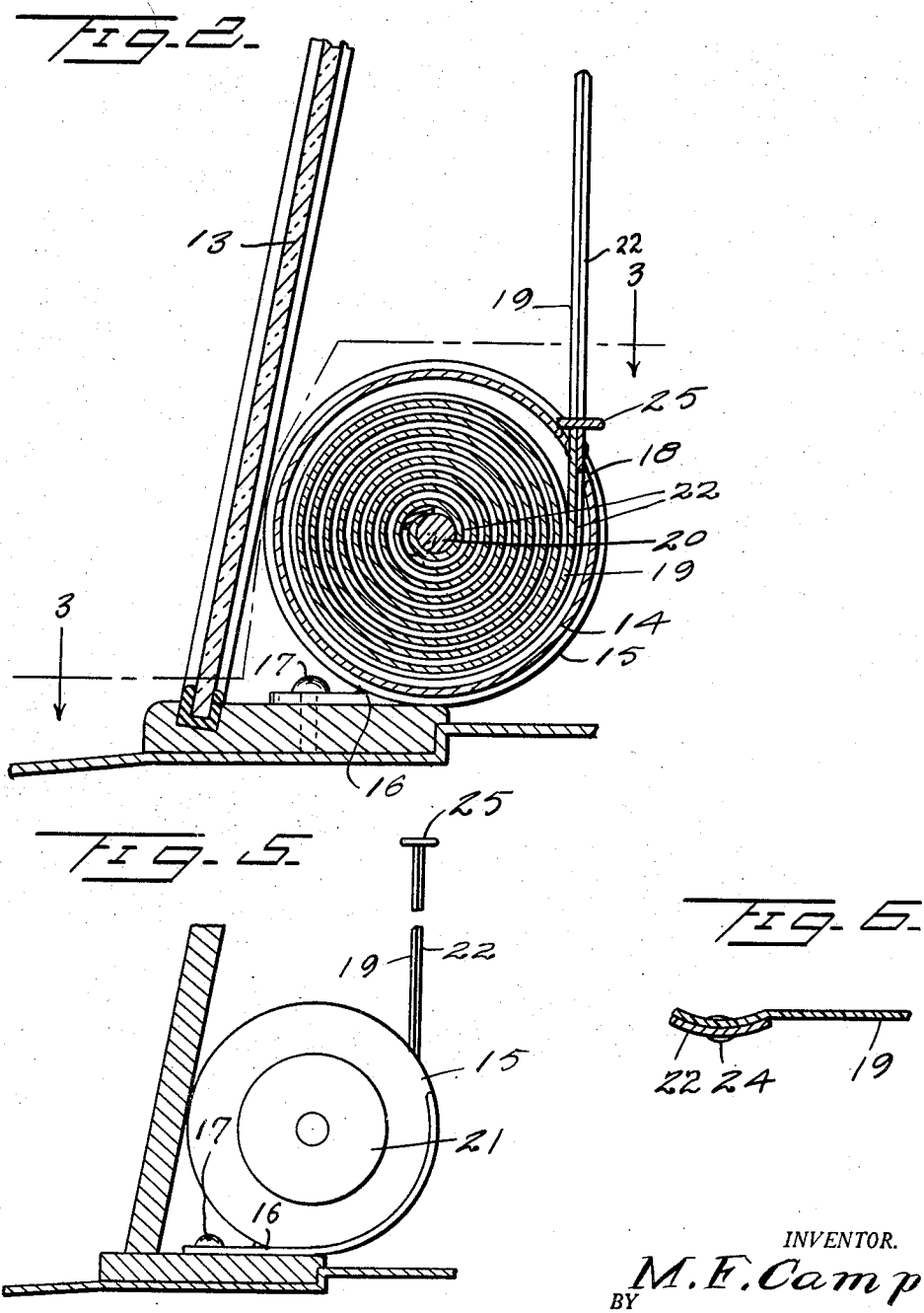
INVENTOR.
M. F. Camp
BY Kimmel & Crowell Attys.

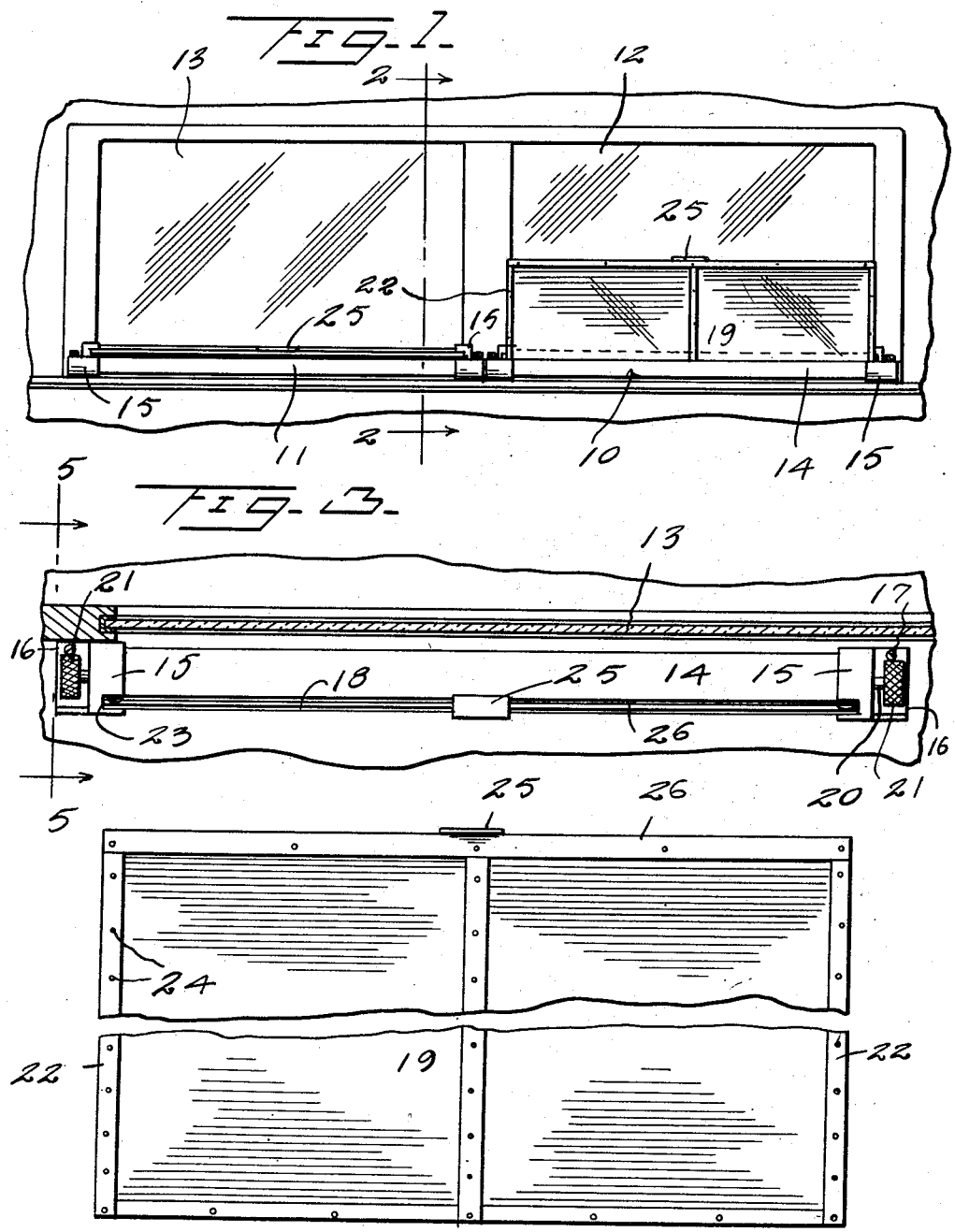

Patented Apr. 3, 1951

2,547,373

UNITED STATES PATENT OFFICE 2,547,373

SELF-CONTAINED RISING SHADE

Marshall F. Camp, Creston, Iowa

Application February 14, 1949, Serial No. 76,293

3 Claims. (Cl. 296—97)

This invention relates to an extensible shade for mounting on the inside of a vehicle windshield.

An object of this invention is to provide an extensible shade of the self-sustaining type wherein the roll is lowermost and the shade is pulled upwardly. The shade includes means whereby the extended portion thereof will be self-supporting, and the shade may be formed of fabric, opaque or transparent material, with the latter colored to diffuse glaring light rays.

Another object of this invention is to provide a self-sustaining shade of this kind which can be mounted at the bottom of the windshield, being secured to the frame or bezel which holds the glass, or which may be secured to the upper side of the ledge which extends rearwardly from the windshield, the place of securement being determined by the user and the availability of means adjacent the windshield for mounting the device.

With the above and other objects in view, my invention consists in the arrangement, combination and details of construction disclosed in the drawings and specification, and then more particularly pointed out in the appended claims.

In the drawings,

Figure 1 is a detail rear elevation of a pair of shades constructed according to an embodiment of this invention, showing the shades mounted on the inner side of a windshield structure, Figure 2 is a fragmentary enlarged sectional view taken on the line 2—2 of Figure 1, Figure 3 is a fragmentary sectional view taken on the line 3—3 of Figure 2 rotated 90° clockwise, Figure 4 is a plan view of the shade completely removed from the housing, Figure 5 is a fragmentary sectional view taken on the line 5—5 of Figure 3, Figure 6 is a fragmentary horizontal section showing the attachment of the shade element to the resilient supporting means.

Referring to the drawings, the numerals 10 and 11 designate generally a pair of shade structures which are mounted on the inner side of a pair of windshields 12 and 13 respectively. A tubular housing 14 is disposed at the lower portion of each windshield and the housing 14 includes a pair of end cap members 15, having a base flange 16 extended laterally therefrom, whereby the tubular member 14 with the cap 15 may be secured by fastening means 17 to a suitable portion of the windshield frame structure.

The tubular housing 14 is provided with an elongated longitudinally extending opening 18 through which a shade element 19 is adapted to be extended. The shade element 19 may be formed of any suitable flexible material and may either be colored to provide a non-glare shade or may be translucent.

A shaft 20 is rotatably disposed in the housing 14, being projected through the caps 15 and operating knobs 21 are secured to the opposite ends of the shaft 20. The shade member 19 is fixed to at least a pair of transversely curved resilient bands 22 which are secured to the shaft 20 and the bands 22 at the opposite lengthwise edges of the shade member 19 are adapted to be extended through slots 23 provided in the caps 15.

The shade member 19 is secured to the concave side of the strap 20 by fastening means 24. A handle 25 is secured to a reinforcing strip 26 which is fixed to the edge of the shade member 19 so that the shade member 19 may be pulled upwardly by pulling on the handle 25. The provision of the straps 22 will assure the shade member 19 being supported in substantially a vertical position when the shade member 19 is extended, the straps 22 being of such construction that when they are extended from the caps 15, the extended portions of the straps will straighten out and form resilient vertical supports for the shade member 19. It will, of course be understood that there may be as many of these supporting straps 22 as may be desired, there being three such supporting straps shown in the drawings.

The knobs 21 will provide a means whereby the shade may be retracted to be disposed entirely within the housing 14. This shade structure is adapted to be mounted at the lower portion of a windshield so as to eliminate glare from a wet road or the like and to restrict the open portion of the windshield to a point adjacent the upper portion of the latter. By providing the shade member 19 with self-supporting straps 22, this shade member may be mounted at the lower edge of the windshield and no additional means will be provided to hold the shade in its extended position.

I do not mean to confine myself to the exact details of construction herein disclosed, but claim all variations falling within the purview of the appended claims.

What I claim is:

1. An extensible shade comprising a tubular housing having a lengthwise slot, caps at the ends of said housing, a shaft journalled through said caps, at least one knob on said shaft, a flexible shade member fixed at one end to said shaft and wound thereabout, the opposite end of said shade extending through said slot, and a pair of elongated transversely arcuate resilient bands fixed to the opposite lengthwise edges of said shade and also fixed to said shaft, said bands upon extension thereof from said housing inherently straightening out and providing a supporting means for supporting said shade in extended position.

2. An extensible shade comprising a tubular housing having a lengthwise slot, caps at the ends of said housing, a shaft journalled through said caps, at least one knob on said shaft, a flexible shade member fixed at one end to said shaft and wound thereabout, the opposite end of said shade extending through said slot, a reinforcing strip fixed to said opposite end of said shade, and a pair of elongated transversely arcuate resilient bands fixed to the opposite lengthwise edges of said shade and also fixed to said shaft, said bands upon extension thereof from said housing inherently straightening out and providing a supporting means for supporting said shade in extended position.

3. An extensible shade comprising a tubular housing having a lengthwise slot, caps at the ends of said housing, a shaft journalled through said caps, at least one knob on said shaft, a flexible shade member fixed at one end to said shaft and wound thereabout, the opposite end of said shade extending through said slot, a reinforcing strip fixed to said opposite end of said shade, a handle carried by said strip, and a pair of elongated transversely arcuate resilient bands fixed to the opposite lengthwise edges of said shade and also fixed to said shaft, said bands upon extension thereof from said housing inherently straightening out and providing a supporting means for supporting said shade in extended position.

MARSHALL F. CAMP.

REFERENCES CITED

The following references are of record in the file of this patent:

UNITED STATES PATENTS

| Number | Name | Date |
|---|---|---|
| 184,944 | Wilson | Nov. 28, 1876 |
| 1,302,969 | Pratt | May 6, 1919 |
| 1,958,695 | Claus | May 15, 1934 |